United States Patent
Tanaka et al.

(10) Patent No.: US 7,351,490 B2
(45) Date of Patent: Apr. 1, 2008

(54) FUEL CELL

(75) Inventors: Hiroyuki Tanaka, Utsunomiya (JP); Tadashi Nishiyama, Shioya-gun (JP); Takaki Nakagawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 576 days.

(21) Appl. No.: 10/768,909

(22) Filed: Jan. 29, 2004

(65) Prior Publication Data

US 2004/0185322 A1 Sep. 23, 2004

(30) Foreign Application Priority Data

Jan. 30, 2003 (JP) ............................. 2003-022502

(51) Int. Cl.
*H01M 2/00* (2006.01)
*H01M 2/02* (2006.01)
*H01M 2/08* (2006.01)

(52) U.S. Cl. .......................................... 429/35; 429/34
(58) Field of Classification Search ...................... None
See application file for complete search history.

(56) References Cited

U.S. PATENT DOCUMENTS

| 4,444,851 | A | * | 4/1984 | Maru | 429/26 |
| 4,640,876 | A | * | 2/1987 | Warzawski et al. | 429/37 |
| 5,284,718 | A | * | 2/1994 | Chow et al. | 429/26 |
| 5,922,485 | A | * | 7/1999 | Enami | 429/26 |
| 6,261,711 | B1 | * | 7/2001 | Matlock et al. | 429/34 |
| 6,872,485 | B2 | * | 3/2005 | Inoue et al. | 429/34 |
| 7,014,939 | B2 | | 3/2006 | Suenaga et al. | |

FOREIGN PATENT DOCUMENTS

| CA | 2564237 A1 | 7/2002 |
| DE | 19743067 C2 | 4/1999 |
| DE | 10107790 A1 | 8/2002 |
| DE | 10203174 A1 | 9/2002 |
| WO | WO-02065572 | 8/2002 |

OTHER PUBLICATIONS

German Office Action for Application No. 102004004071.0, dated Dec. 22, 2006.
Canadian Office Action for Application No. 2456245, dated Aug. 28, 2007.

\* cited by examiner

*Primary Examiner*—Patrick Joseph Ryan
*Assistant Examiner*—Julian Mercado
(74) *Attorney, Agent, or Firm*—Lahive & Cockfield, LLP; Anthony A. Laurentano, Esq.

(57) ABSTRACT

A first seal structure includes a seal joint and seal members connected to the seal joint. An interior angle at the seal joint defined by central lines of the seal members is in a range of 40° to 90°. The seal joint includes a curved portion having a predetermined radius of curvature R for connecting the seal members.

7 Claims, 10 Drawing Sheets

Prior Art
FIG. 10

FUEL CELL

BACKGROUND OF THE INVENTION

1. Field of the Invention

The present invention relates to a fuel cell including an electrolyte electrode assembly, and separators for sandwiching the electrolyte electrode assembly. The electrolyte electrode assembly includes a pair of electrodes and an electrolyte interposed between the electrodes. In the fuel cell, reactant gas flow fields are formed on surfaces of the separators for supplying reactant gases along the surfaces of the separators. Each of the reactant gas flow fields is connected between a reactant gas supply passage and a reactant gas discharge passage.

2. Description of the Related Art

For example, a solid polymer electrolyte fuel cell employs a membrane electrode assembly (MEA) which includes two electrodes (anode and cathode), and an electrolyte membrane interposed between the electrodes. The electrolyte membrane is a polymer ion exchange membrane. The membrane electrode assembly is interposed between separators.

In the fuel cell, a fuel gas (reactant gas) such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. A gas chiefly containing oxygen (oxygen-containing gas) or air is supplied to the cathode. At the cathode, the hydrogen ions from the anode combine with the electrons and oxygen to produce water.

In the fuel cell, the fuel gas, the oxygen-containing gas, and the coolant flow through their dedicated fluid passages which are hermetically sealed for preventing gas or liquid leakages. Typically, seal members are interposed between the membrane electrode assembly and the separator for preventing leakages. Various types of seal members are known. For example, U.S. Pat. No. 5,284,718 discloses a seal structure shown in FIG. 10. According to the disclosure, a membrane electrode assembly (membrane electrode and seal assembly) comprises a porous electrically conductive sheet material 1.

Figure 10:
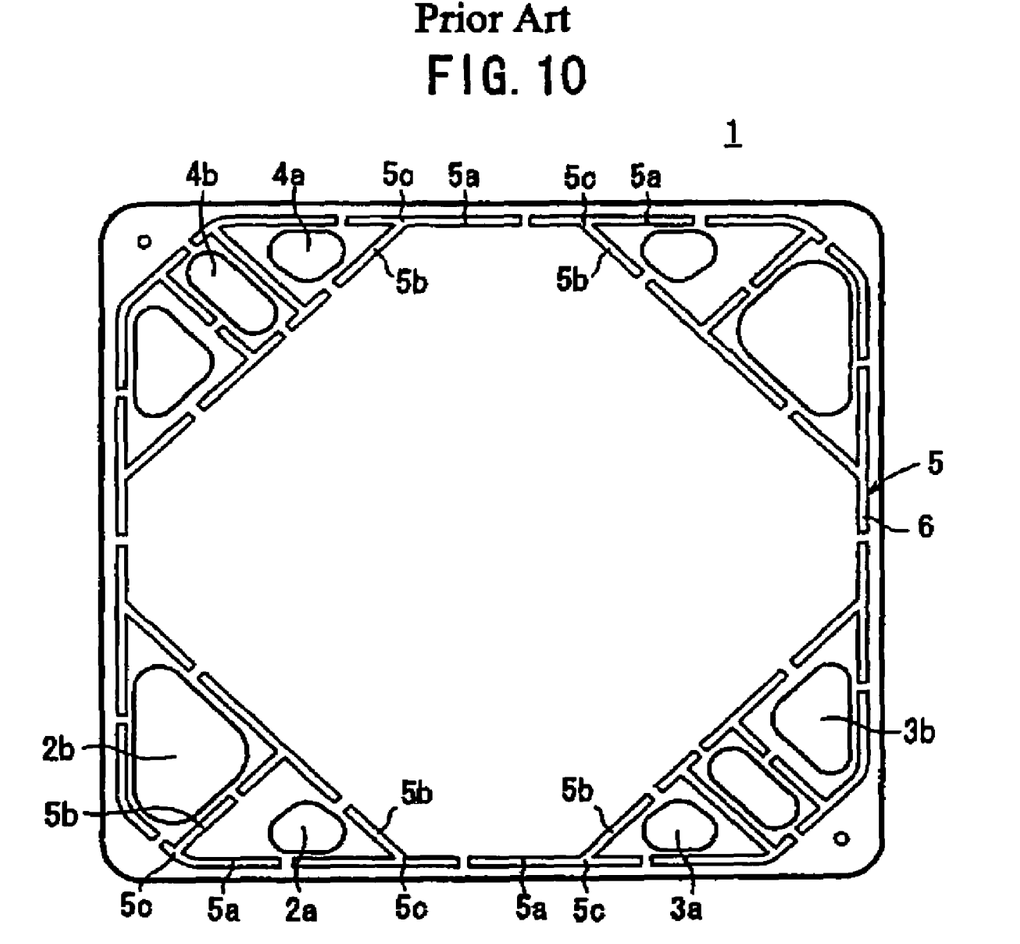
FIG. 10 is a front view showing a conventional seal structure.

The electrically conductive sheet material 1 has an air inlet opening 2a and an air outlet opening 2b at one corner, and a hydrogen inlet opening 3a and a hydrogen outlet opening 3b at another corner. Further, a coolant inlet opening 4a and a coolant outlet opening 4b are formed at a corner diagonally opposite to the corner of the hydrogen inlet opening 3a and the hydrogen outlet opening 3b. A solid gasket 5 is provided in the electrically conductive sheet material 1. The gasket 5 is placed in a channel 6 when the fuel cell stack is assembled.

The gasket 5 includes seal members 5a provided around the outer area of the electrically conductive sheet material 1. The seal members 5a are connected to the seal members 5b. Thus, seal joints 5c for connecting the seal members 5a, 5b are provided on the seal surface of the gasket 5.

According to the structure, however, the adjacent seal members 5a, 5b are likely to be affected by each other. Specifically, local line pressure or surface pressure applied to the seal joint 5a increases excessively. Consequently, the electrically conductive sheet material 1 may be deformed undesirably, and the desired sealing performance can not be achieved.

SUMMARY OF THE INVENTION

A main object of the present invention is to provide a fuel cell with a simple structure in which line pressure or surface pressure applied to seal members does not increase locally so that the sealing performance can be maintained, and the desired power generation performance can be achieved.

According to the present invention, a seal structure is provided between the electrolyte electrode assembly and the separator, around at least one of an electrode, a reactant gas supply passage, and a reactant gas discharge passage. The seal structure includes a seal joint and at least two seal members connected to the seal joint. An interior angle at the seal joint defined by central lines of the seal members is in a range of 40° to 90°, and the seal joint has a curved portion for connecting the seal members.

Since the interior angle at the seal joint defined by the central lines of the seal members is in the range of 40° to 90°, the surface pressure applied to the seal joint does not increase excessively when the seal members are compressed. The pressure is applied uniformly to the entire surfaces of the seal members. Since the seal joint has the curved portion for connecting the seal members, stress concentration does not occur at the seal joint. The difference between the surface pressure applied to the seal joint and the surface pressure applied to the straight portion of the seal member is small.

Thus, undesirable interferences between the seal members are prevented. The surface pressure or the line pressure does not increase locally.

The curved portion of the seal joint has a radius of curvature R in a range of 6.0 mm to 9.0 mm. Thus, the difference between the surface pressure applied to the seal joint and the surface pressure applied to the straight portion of the seal member is small, and the maximum internal pressure of the seal structure is considerably high.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
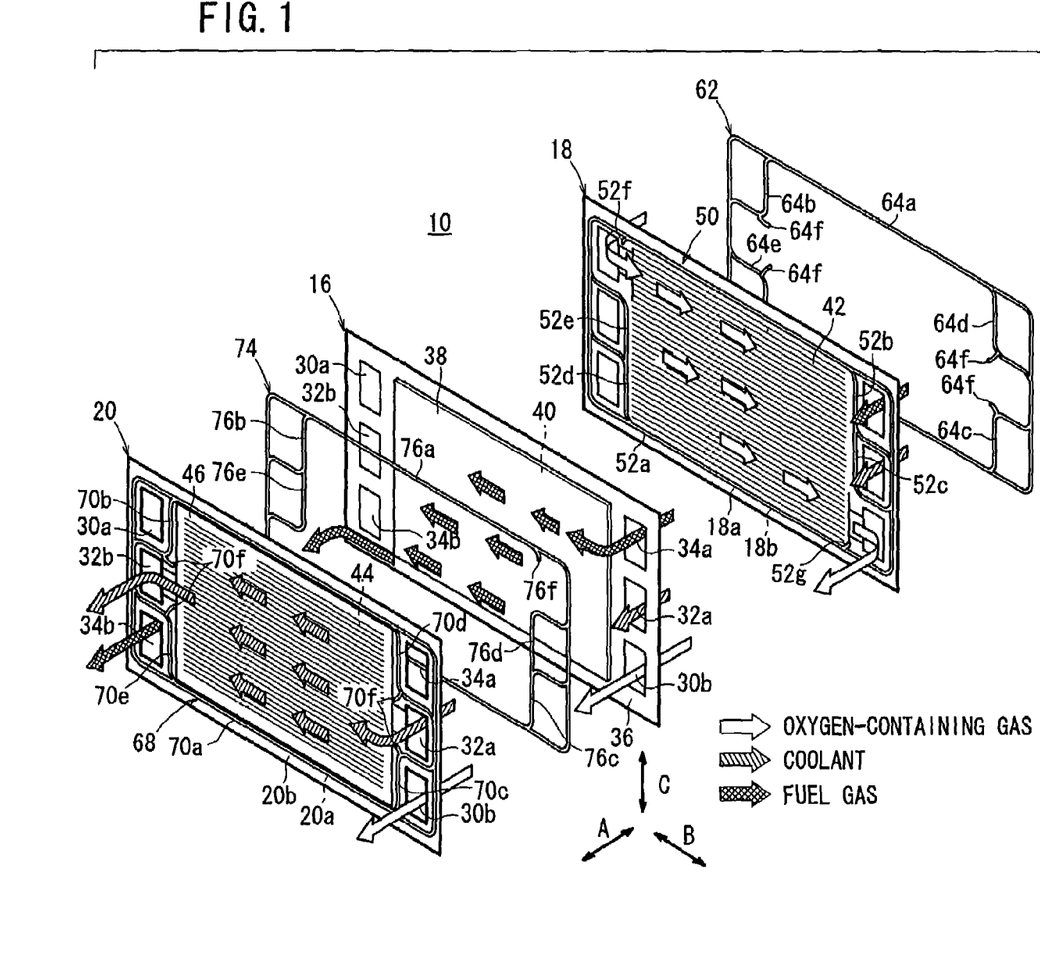
FIG. 1 is an exploded perspective view showing main components of a fuel cell according to an embodiment of the present invention.
Figure 2:
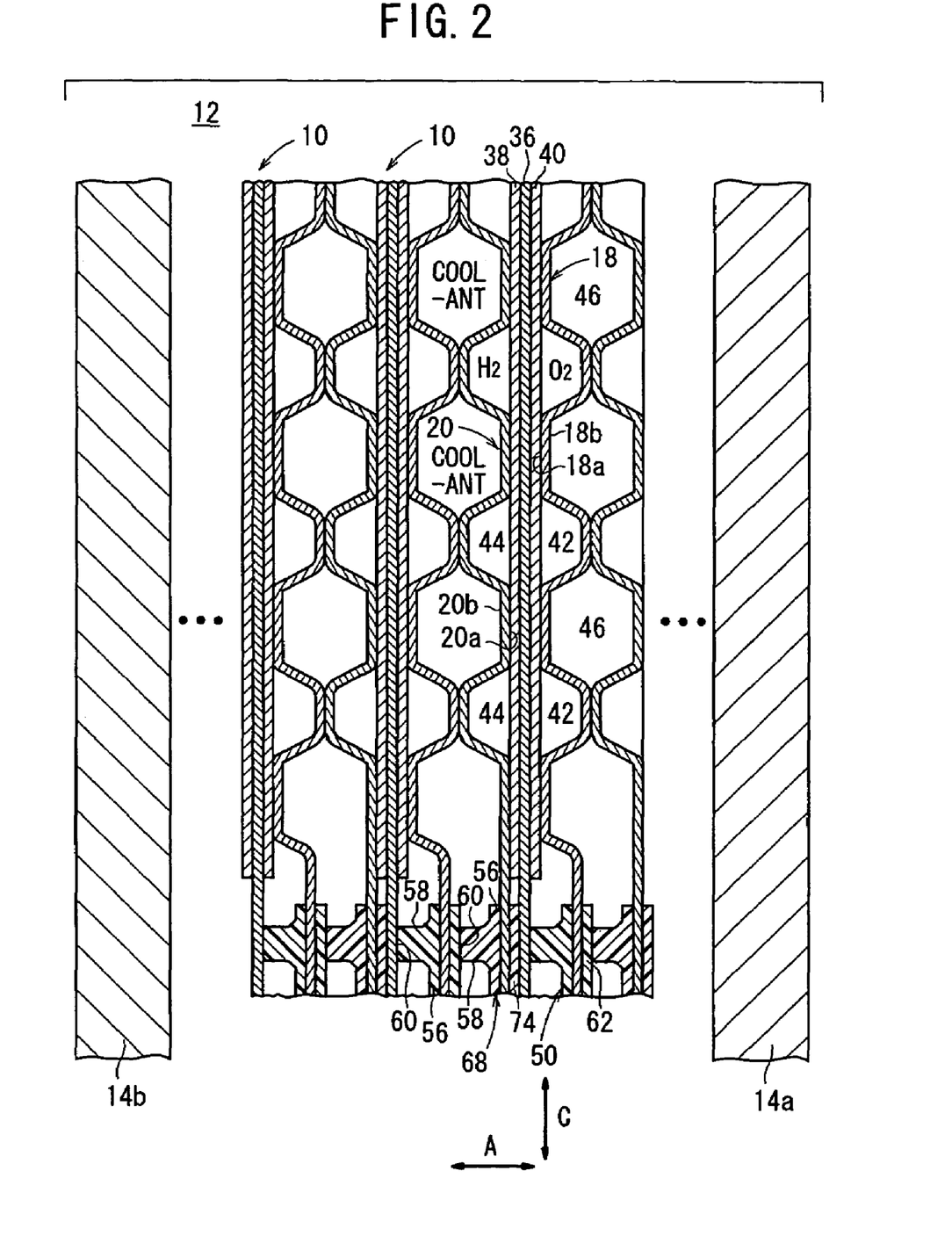
FIG. 2 is a cross sectional view showing main components of a fuel cell stack formed by stacking the fuel cells.

FIG. 1 is an exploded perspective view showing main components of a fuel cell 10 according to an embodiment of the present invention and FIG. 2 is a cross sectional view showing main components of a fuel cell stack 12 formed by stacking a plurality of the fuel cells 10.

As shown in FIG. 2, the fuel cell stack 12 is formed by stacking a plurality of the fuel cells 10 in a direction indicated by an arrow A. End plates 14a, 14b are provided at opposite ends of the fuel cell stack 12 in the stacking direction. The end plates 14a, 14b are fastened by tie rods (not shown) for tightening the fuel cells 10 with a predetermined tightening force in the direction indicated by the arrow A.

As shown in FIG. 1, the fuel cell 10 includes a membrane electrode assembly (electrolyte electrode assembly) 16 and first and second metal separators 18, 20 for sandwiching the membrane electrode assembly 16. For example, the first and second metal separators 18, 20 are stainless steel plates, aluminum plates, plated steel sheets, or metal plates having anti-corrosive surfaces by surface treatment. The first and second metal separators 18, 20 have a thickness ranging from, e.g., 0.05 mm to 1.0 mm. Carbon separators or exfoliated graphite separators may be used instead of the first and second metal separators 18, 20.

As shown in FIG. 1, at one horizontal end of the fuel cell 10 in a direction indicated by an arrow B, an oxygen-containing gas supply passage (reactant gas supply passage) 30a for supplying an oxygen-containing gas, a coolant discharge passage 32b for discharging a coolant, and a fuel gas discharge passage (reactant gas discharge passage) 34b for discharging a fuel gas such as a hydrogen-containing gas are arranged vertically in a direction indicated by an arrow C. The oxygen-containing gas supply passage 30a, the coolant discharge passage 32b, and the fuel gas discharge passage 34b extend through the fuel cell 10 in the stacking direction indicated by the arrow A.

At the other horizontal end of the fuel cell 10 in the direction indicated by the arrow B, a fuel gas supply passage (reactant gas supply passage) 34a for supplying the fuel gas, a coolant supply passage 32a for supplying the coolant, and an oxygen-containing gas discharge passage (reactant gas discharge passage) 30b for discharging the oxygen-containing gas are arranged vertically in the direction indicated by the arrow C. The fuel gas supply passage 34a, the coolant supply passage 32a, and the oxygen-containing gas discharge passage 30b extend through the fuel cell 10 in the direction indicated by the arrow A.

The membrane electrode assembly 16 comprises an anode 38, a cathode 40, and a solid polymer electrolyte membrane 36 interposed between the anode 38 and the cathode 40. The solid polymer electrolyte membrane 36 is formed by impregnating a thin membrane of perfluorosulfonic acid with water, for example.

Each of the anode 38 and cathode 40 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the anode 38 and the electrode catalyst layer of the cathode 40 are fixed to both surfaces of the solid polymer electrolyte membrane 36, respectively.

The first metal separator 18 has an oxygen-containing gas flow field (reactant gas flow field) 42 on its surface 18a facing the membrane electrode assembly 16. The oxygen-containing gas flow field 42 includes a plurality of grooves extending straight in the direction indicated by the arrow B, for example. The oxygen-containing gas flow field 42 is connected to the oxygen-containing gas supply passage 30a at one end, and connected to the oxygen-containing gas discharge passage 30b at the other end. As shown in FIGS. 1 and 2, the second metal separator 20 has a fuel gas flow field (reactant gas flow field) 44 on its surface 20a facing the membrane electrode assembly 16. The fuel gas flow field 44 includes a plurality of grooves extending straight in the direction indicated by the arrow B. The fuel gas flow field 44 is connected to the fuel gas supply passage 34a at one end, and connected to the fuel gas discharge passage 34b at the other end.

A coolant flow field 46 is formed between a surface 18b of the first metal separator 18 and a surface 20b of the second metal separator 20. The coolant flow field 46 includes a plurality of grooves extending straight in the direction indicated by the arrow B. The coolant flow field 46 is connected to the coolant supply passage 32a at one end, and connected to the coolant discharge passage 32b at the other end.

Figure 3:
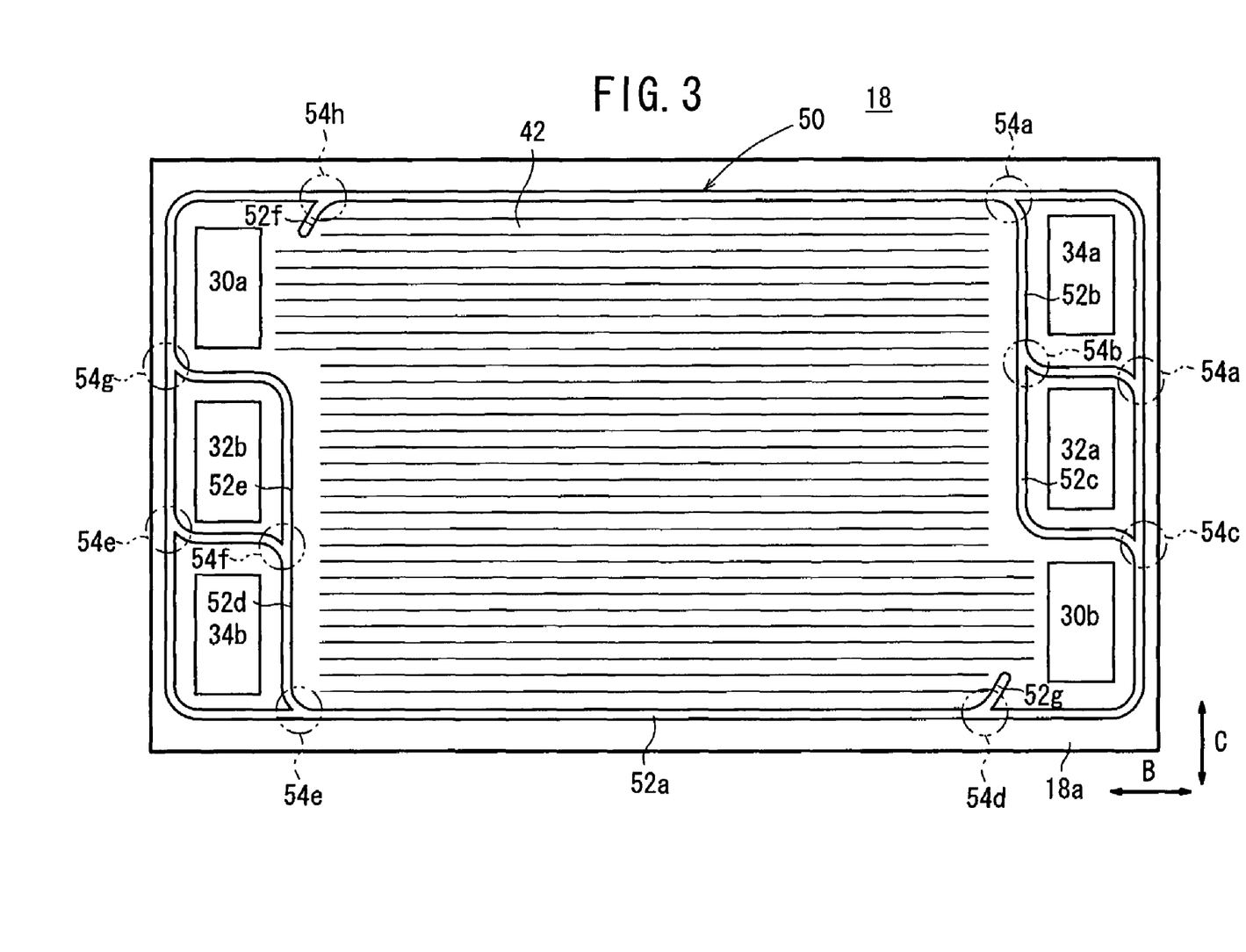
FIG. 3 is a front view showing a first metal separator of the fuel cell.

A first seal structure 50 is provided on the surface 18a of the first metal separator 18, around the cathode 40, i.e., around the oxygen-containing gas flow field 42, the oxygen-containing gas supply passage 30a, and the oxygen-containing gas discharge passage 30b. As shown in FIG. 3, the first seal structure 50 includes a plurality of seal members. The first seal structure 50 includes a seal member (first seal member) 52a provided around an outer region on the surface 18a of the first metal separator 18. A second seal member 52b is connected to the seal member 52a for preventing leakage between the oxygen-containing gas flow field 42 and the fuel gas supply passage 34a. Further, a seal member 52c is connected to the seal member 52a and the seal member 52b for leakage between the oxygen-containing gas supply passage 42 and the coolant supply passage 32a.

Similarly, a seal member 52d is connected to the seal member 52a for preventing leakage between the oxygen-containing gas flow field 42 and the fuel gas discharge passage 34b. A seal member 52e is connected to the seal member 52a and the seal member 52d for preventing leakage between the coolant discharge passage 32b and the oxygen-containing gas flow field 42. Further, seal members (third seal members) 52f, 52g are connected to the seal member 52a near the oxygen-containing gas supply passage 30a, and the oxygen-containing gas discharge passage 30b, respectively, for guiding the flow of the oxygen-containing gas.

At one end of the first seal structure 50 in the direction indicated by the arrow B, seal joints 54a, 54b, 54c, 54d are formed. The seal member 52a and the seal member 52b are connected to the seal joint 54a. The seal member 52b and the seal member 52c are connected to the seal joint 54b. The seal member 52c and the seal member 52a are connected to the seal joint 54c. The seal member 52a and the seal member 52g are connected to the seal joint 54d.

At the other end of the first seal structure 50 in the direction indicated by the arrow B, seal joints 54e, 54f, 54g, 54h are formed. The seal member 52a and the seal member 52d are connected to the seal joint 54e. The seal member 52d and the seal member 52*e* are connected to the seal joint 54*f*. The seal member 52*e* and the seal member 52*a* are connected to the seal joint 54*g*. The seal member 52*a* and the seal member 52*f* are connected to the seal joint 54*h*.

Since the seal joints 54*a* through 54*h* have the same structure, one of the seal joints 54*a* through 54*h*, i.e., the seal joint 54*a* will be described in detail, and description of the other seal joints 54*b* through 54*h* will be omitted.

Figure 4:
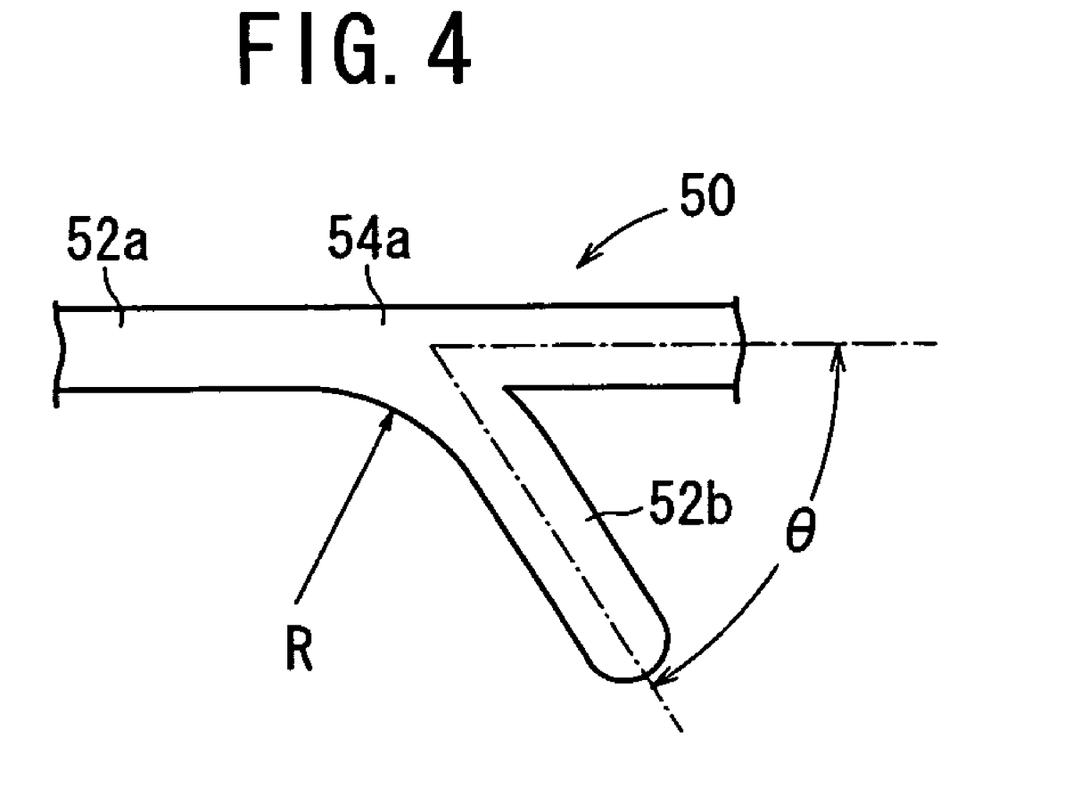
FIG. 4 is a view showing main components of a first seal structure provided in the first metal separator.

In FIG. 4, an interior angle θ of the seal joint 54*a* defined by central lines of the seal members 52*a*, 52*b* is in a range of 40° to 90°, and preferably in a range of 60° to 90°. The seal joint 54*a* has a curved portion connected to the seal member 52*a* and the seal member 52*b*. The curved portion has a radius of curvature R in a range of 6.0 mm to 9.0 mm. A portion of the seal member 52*b* connected to the seal joint 54*a* has a seal width W which is substantially the same as a seal width of the seal member 52*a*. Therefore, undesirable interferences between the seal members 52*a*, 52*b* are prevented.

The first seal structure 50 is made of seal material, cushion material or packing material such as EPDM (Ethylene Propylene Diene Monomer), NBR (Nitrile Butadiene Rubber), fluoro rubber, silicon rubber, fluoro silicon rubber, butyl rubber (Isobutene-Isoprene Rubber), natural rubber, styrene rubber, chloroprene rubber, or acrylic rubber. The first seal structure 50 has a hardness ranging from 30 degrees to 50 degrees according to JIS K6253 type A durometer.

Figure 5:
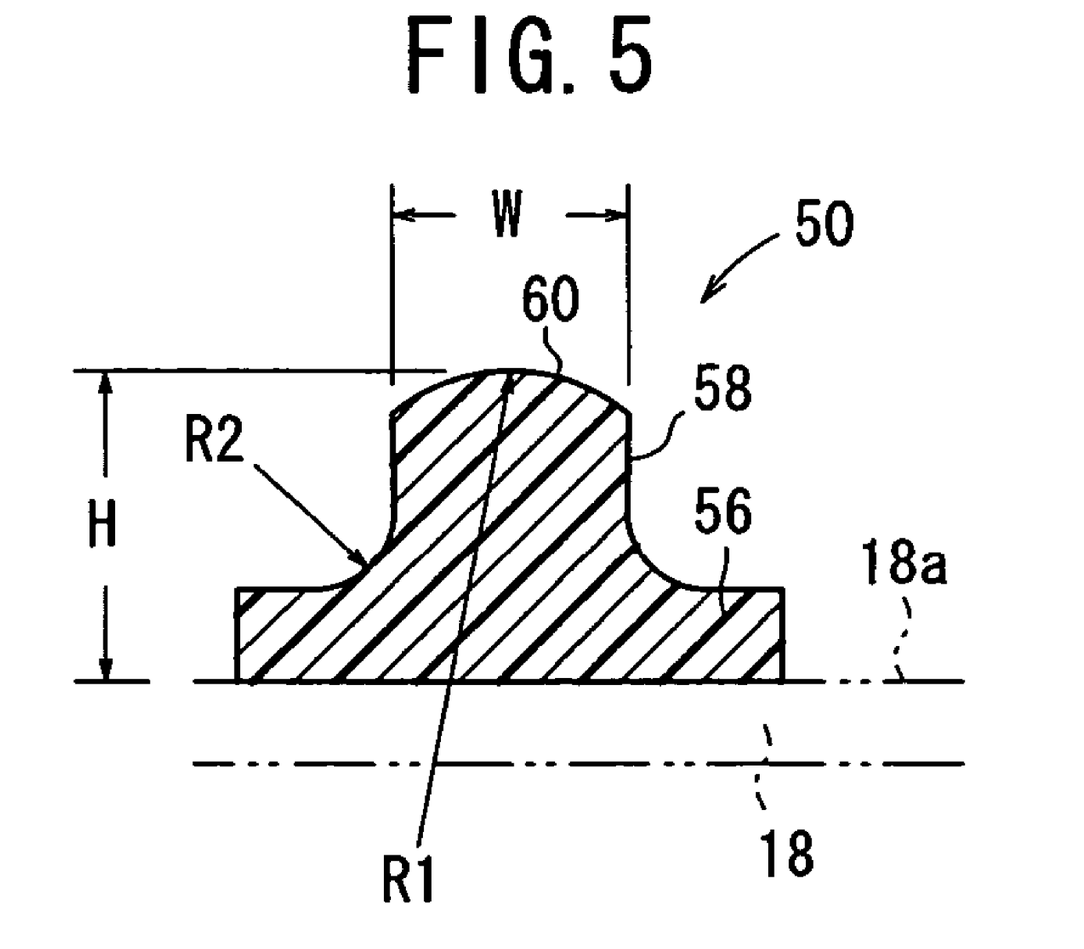
FIG. 5 is a cross sectional view showing a seal member of the fuel cell.

As shown in FIG. 5, the first seal structure 50 includes a base portion 56 formed integrally on the surface 18*a* of the first metal separator 18, and a columnar portion 58 having a columnar cross section, and a curved edge portion 60 having a curved cross section with a predetermined radius of curvature. The columnar portion 58 protrudes from the base portion 56 with a predetermined draft angle, for example, ranging from 0° to 1°.

The radius of curvature R1 of the curved edge portion 60 is ranging from 1.0 mm to 3.0 mm. The seal width of the curved edge portion 60 is 1.0 mm or greater. When the curved edge portion 60 is in contact with the solid polymer electrolyte membrane 36 for pressing the surface 20*a* of the second metal separator 20, the width of the contact area is 1.5 mm or greater. The aspect ratio of the first seal structure 50 is not more than 1.5, i.e., H/W≦1.5 (where W is the width of the columnar portion 58, and H is the height from the base portion 56 to the curved edge portion 60). The radius of curvature R2 of the base portion 56 is ranging from 0.3 mm to 1.0 mm for preventing stress concentration between the columnar portion 58 and the base portion 56.

As shown in FIGS. 1 and 2, a second seal structure 62 is formed on the surface 18*b* of the first metal separator 18. The second seal structure 62 includes a seal member 64*a* provided around an outer region on the surface 18*b*, a seal member 64*b* for preventing leakage between the coolant flow field 46 and the oxygen-containing gas supply passage 30*a*, and a seal member 64*c* for preventing leakage between the coolant flow field 46 and the oxygen-containing gas discharge passage 30*b*. The second seal structure 62 includes a seal member 64*d* for preventing leakage between the coolant flow field 46 and the fuel gas supply passage 34*a*, and a seal member 64*e* for preventing leakage between the coolant flow field 46 and the fuel gas discharge passage 34*b*. Further, the second seal structure 62 includes seal members 64*f* connected to the seal members 62*b* through 62*e*, respectively. The second seal structure 62 has a rectangular cross section.

A third seal structure 68 is formed on the surface 20*b* of the second metal separator 20. The third seal structure 68 includes a seal member 70*a* provided around an outer region on the surface 20*b*, a seal member 70*b* for preventing leakage between the coolant flow field 46 and the oxygen-containing gas supply passage 30*a*, and a seal member 70*c* for preventing leakage between the coolant flow field 46 and the oxygen-containing gas discharge passage 30*b*. The third seal structure 68 includes a seal member 70*d* for preventing leakage between the coolant flow field 46 and the fuel gas supply passage 34*a*, and a seal member 70*e* for preventing leakage between the coolant flow field 46 and the fuel gas discharge passage 34*b*. Further, the third seal structure 68 includes seal members 70*f* connected to the seal members 70*b* through 70*e*, respectively.

A fourth seal structure 74 is formed on the surface 20*a* of the second metal separator 20. The fourth seal structure 74 includes a seal member 76*a* provided around an outer region on the surface 20*a*, a seal member 76*b* for preventing leakage between the fuel gas flow field 44 and the oxygen-containing gas supply passage 30*a*, a seal member 76*c* for preventing leakage between the fuel gas flow field 44 and the oxygen-containing gas discharge passage 30*b*. The fourth seal structure 74 includes a seal member 76*d* for preventing leakage between the fuel gas flow field 44 and the coolant supply passage 32*a*, and a seal member 76*e* for preventing leakage between the fuel gas flow field 44 and the coolant discharge passage 32*b*. Further, seal members 76*f* are connected to the seal member 76*a* near the fuel gas supply passage 34*a*, and the fuel discharge passage 34*b*, respectively. The fourth seal structure 74 has a rectangular cross section as with the second seal structure 62.

The second through fourth seal structures 62, 68, 74 have seal joints as with the first seal structure 50. The seal joints of the second through fourth seal structures 62, 68, 74 have the same structure as the seal joint 54*a* shown in FIG. 4, and description thereof is omitted.

Next, operation of the fuel cell 10 will be described.

In operation, as shown in FIG. 1, an oxygen-containing gas such as air is supplied to the oxygen-containing gas supply passage 30*a*, a fuel gas such as a hydrogen-containing gas is supplied to the fuel gas supply passage 34*a*, and a coolant such as pure water, an ethylene glycol or an oil is supplied to the coolant supply passage 32*a*.

The oxygen-containing gas flows from the oxygen-containing gas supply passage 30*a* into the oxygen-containing gas flow field 42 of the first metal separator 18. The oxygen-containing gas flows in the direction indicated by the arrow B along the cathode 40 of the membrane electrode assembly 16 to induce a chemical reaction at the cathode 40. The fuel gas flows from the fuel gas supply passage 34*a* into the fuel gas flow field 44 of the second metal separator 20. The fuel gas flows in the direction indicated by the arrow B along the anode 38 of the membrane electrode assembly 16 to induce a chemical reaction at the anode 38.

In the membrane electrode assembly 16, the oxygen-containing gas supplied to the cathode 40, and the fuel gas supplied to the anode 38 are consumed in the electrochemical reactions at catalyst layers of the cathode 40 and the anode 38 for generating electricity.

After the oxygen-containing gas is consumed at the cathode 40, the oxygen-containing gas flows into the oxygen-containing gas discharge passage 30*b*, and flows in the direction indicated by the arrow A. Similarly, after the fuel gas is consumed at the anode 38, the fuel gas flows into the fuel gas discharge passage 34*b*, and flows in the direction indicated by the arrow A.

The coolant supplied to the coolant supply passages 32*a* flows into the coolant flow field 46 between the first and second metal separators 18, 20, and flows in the direction indicated by the arrow B. After the coolant is used for cooling the membrane electrode assembly 16, the coolant is discharged into the coolant discharge passages 32b.

In the embodiment of the present invention, the area of contact between the first seal structure 50 and the sealing area (solid polymer electrolyte membrane 36) is large in comparison with the conventional seal structure having a lip shape. Thus, even if the first and second metal separators 18, 20 are deformed due to the gas pressure in the fuel cell 10, or surfaces of the metal separators 18, 20 are corrugated, warped, or distorted, the desired sealing performance can be maintained.

Further, when a plurality of the fuel cells 10 are stacked together to form the fuel cell stack 12, the first seal structure 50 has the toughness. The positional displacement of the first seal structure 50 does not occur. When the curved edge portion 60 of the first seal structure 50 is pressed against the sealing area, the columnar portion 58 of the first seal structure 50 is deformed to compensate for the movement of the sealing area so that the curved edge portion 60 moves together with the sealing area.

Thus, when the fuel cell stack 12 is mounted on a vehicle, the first seal structure 50 is reliably in contact with the sealing area, absorbing vibrations while the vehicle is traveling, and shocks at the time of sudden braking and sudden acceleration.

Further, in the present embodiment, for example, as shown in FIG. 3, the first seal structure 50 includes the seal joints 54a through 54h for connecting the seal members 52a through 52g. In FIG. 4, the interior angle θ at the seal joint 54a defined by the central lines of the seal members 52a and 52b is in the range of 40° through 90°. The seal joint 54a has the curved portion connected to the seal member 52a and the seal member 52b. The curved portion has a predetermined radius of curvature R.

Figure 6:
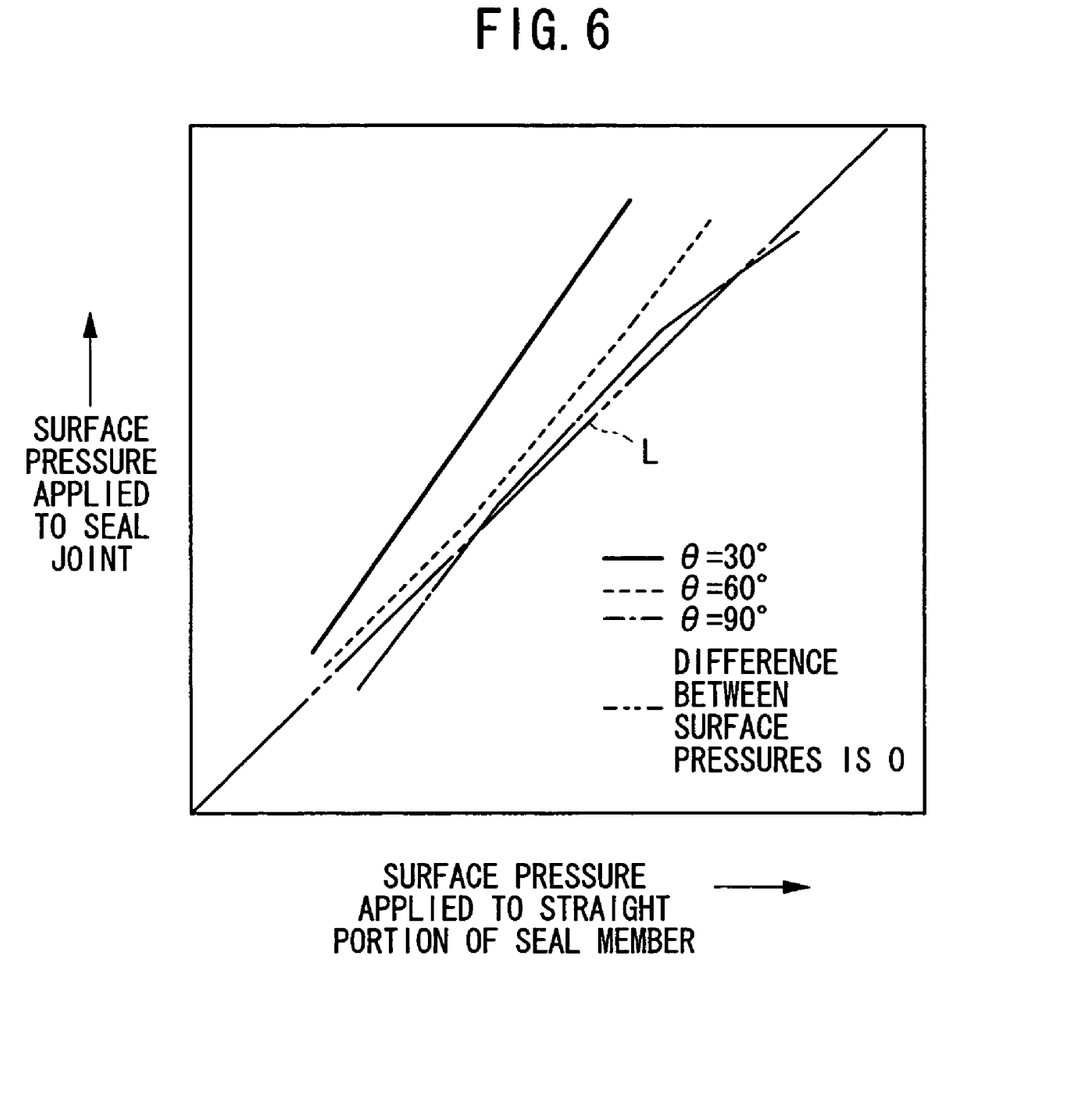
FIG. 6 is a graph showing a relationship between the surface pressure applied to a straight portion of the seal member and the surface pressure applied to a seal joint at different interior angles.

An experiment was carried out by changing the interior angle θ at the seal joint for determining a relationship between the surface pressure applied to a straight portion of the seal member and the surface pressure applied to the seal joint. The results (three lines at angles of 30°, 60°, and 90°) of the experiment are shown in FIG. 6. It is preferable if the pressure applied to the straight portion of the seal member and the pressure applied to the seal joint are the same, i.e., the difference between the surface pressures is 0 as indicated by the straight line L. The line deviated from the line L is not preferable since the difference between the surface pressure applied to the straight portion of the seal member and the surface pressure applied to the seal joint is large. Specifically, the difference between the surface pressures is considerably large if the interior angle θ is 30°.

The interior angle θ should be close to 90°. Preferably, the interior angle θ is in the range of 60° to 90° for preventing the increase of the surface pressure applied to the seal joint. If the interior angle θ is in the range of 60° to 90°, the resulting line is approximately close to the line L, and the difference between the surface pressures in the first seal structure 50 is small. The pressure is uniformly applied to the entire first seal structure 50.

Figure 7:
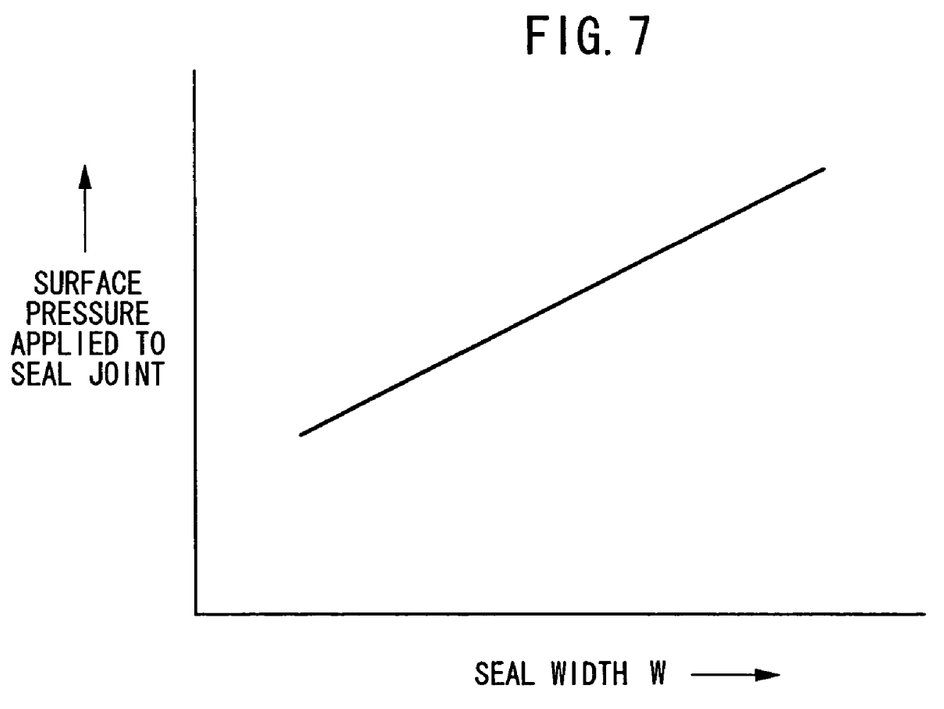
FIG. 7 is a graph showing a relationship between the surface pressure applied to the seal joint and the seal width.

As shown in FIG. 7, the surface pressure applied to the seal joint 54a increases in proportion to the seal width W. Thus, the seal width W should be small for effectively reducing the surface pressure applied to the seal joint 54a.

Figure 8:
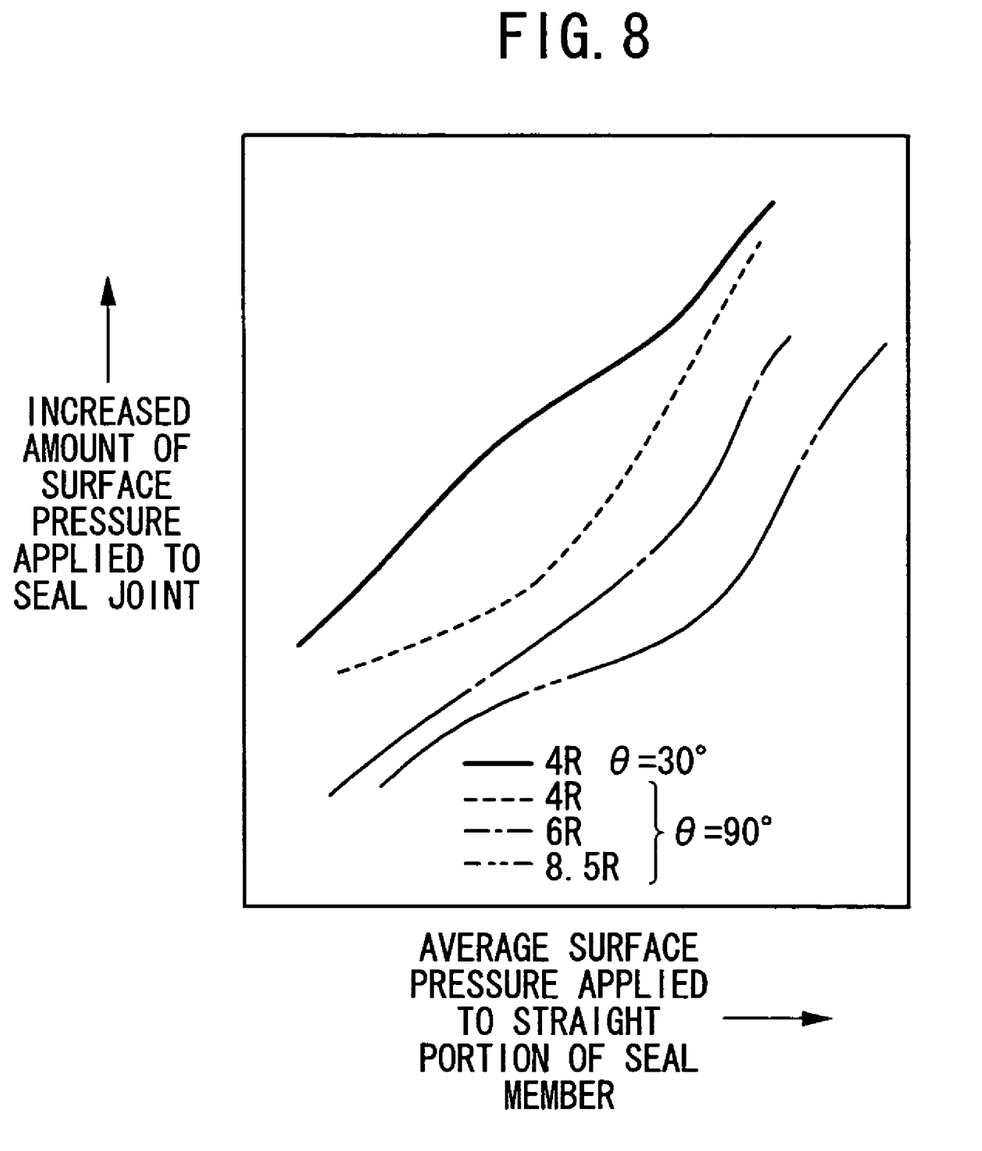
FIG. 8 is a view showing a relationship between the increased amount of the surface pressure applied to the seal joint and the average surface pressure applied to a straight portion of the seal member at different radius of curvatures.

Further, the increased amount of the surface pressure applied to the seal joint 54a was measured at different radius of curvatures R at the seal joint 54a. The result is shown in FIG. 8. For the purpose of comparison, the increased amount of the surface pressure was measured in different conditions, (1) at an interior angle of 30° and the radius of curvature R was 4.0 mm (4R), (2) at an interior angle of 90° and the radius of curvature R was 4.0 mm (4R), (3) at an interior angle of 90° and the radius of curvature R was 6.0 mm (6R), (4) at an interior angle of 90° and the radius of curvature R was 8.5 mm (8.5R). According to the experiment, preferably, the radius of curvature R is 6.0 mm or greater, more preferably, in the range of 6.0 mm to 9.0 mm for suppressing the increase of surface pressure applied to the seal joint in contrast to the increase of the surface pressure applied to the straight portion of the seal member.

If the radius of curvature R is in the range of 6.0 mm to 9.0 mm, the excessive stress concentration at the seal joint 54a is effectively prevented, and the difference between the surface pressure applied to the seal joint 54a and the straight portion of the seal member is small.

Figure 9:
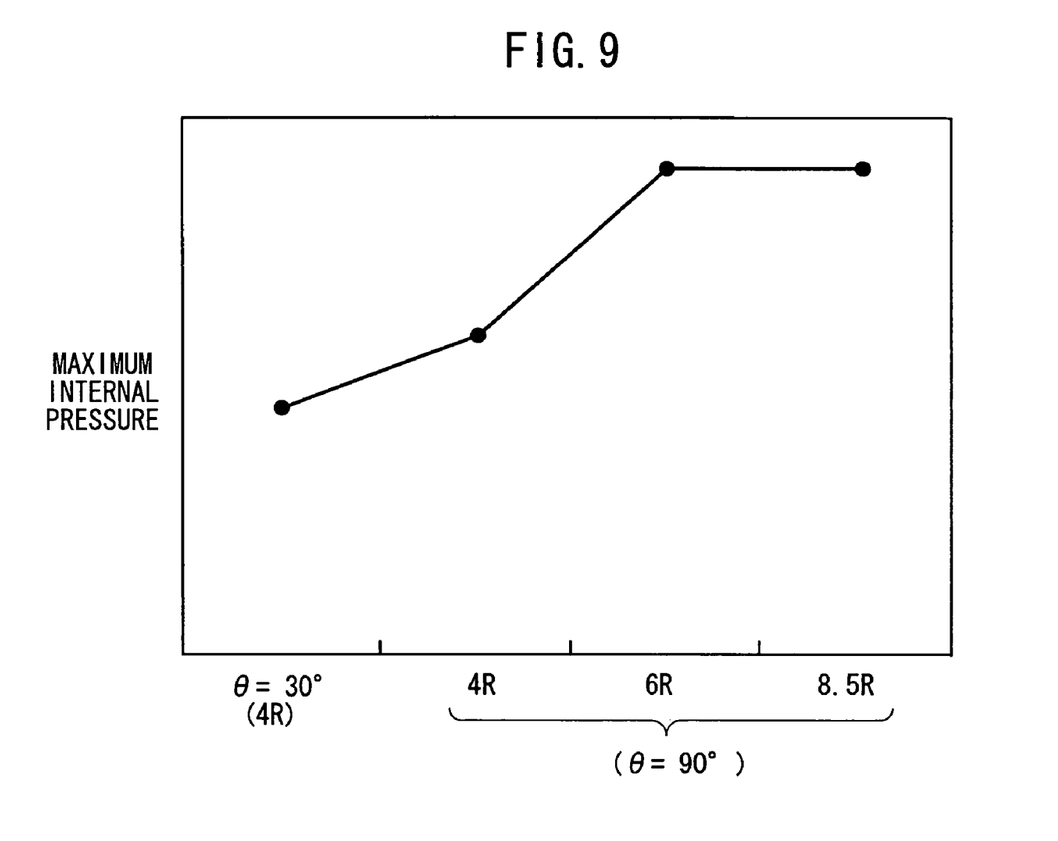
FIG. 9 is a view showing a relationship between the maximum internal pressure and the radius of curvature.

FIG. 9 is a graph showing the maximum internal pressure of the first seal structure 50 by changing the radius of curvature R. The maximum internal pressure herein means a critical pressure which may cause leakage of fluid through the first seal structure 50.

As shown in FIG. 9, if the radius of curvature R is greater than 6.0 mm, the maximum internal pressure of the first seal structure 50 is considerably high. Therefore, the desired sealing performance can be achieved. In the first seal structure 50, the surface pressure or the line pressure does not increase locally. With the reliable sealing function, the desired power generation performance can be achieved.

In the present embodiment, two seal members 52a, 52b are connected to the seal joint 54a. Alternatively, various modifications can be conceived. In alternative embodiments, three or more seal members may be connected to the seal joint 54a, while achieving the similar advantages.

According to the present invention, the interior angle defined by the central lines of the seal members is in the range of 40° to 90°. With this structure, the surface pressure applied to the seal joint does not increase excessively when the seal members are compressed together. Further, the seal joint has a curved portion which is connected to the seal members. Thus, the stress concentration does not occur at the seal joint, and the difference between the surface pressure applied to the seal joint and the surface pressure applied to the straight portion of the seal member is small.

Consequently, undesirable interferences between the seal members are prevented, and the surface pressure or the line pressure does not increase locally. The sealing performance can be maintained reliably, and the desired power generation performance can be achieved.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising:
   an electrolyte electrode assembly including a pair of electrodes and an electrolyte interposed between said electrodes; and
   a pair of separators for sandwiching said electrolyte electrode assembly,
   wherein a reactant gas supply passage and a reactant gas discharge passage extend through said fuel cell in a stacking direction of said fuel cell;

a reactant gas flow field is connected between said reactant gas supply passage and said reactant gas discharge passage on said separator along a surface of said electrode;

a seal structure is provided between said electrolyte electrode assembly and said separator, around at least one of said electrode, said reactant gas supply passage, and said reactant gas discharge passage;

said seal structure includes a seal joint and at least first and second seal members connected to said seal joint;

an interior angle at said seal joint defined by central lines of said first and second seal members is in a range of 40° to 90°; and said seal joint has a straight portion and a curved portion forming a y-shaped joint, wherein the curved portion originates at a non-terminal location of the straight portion and curves away from the straight portion of said seal joint.

2. A fuel cell according to claim 1, wherein said curved portion of said seal joint has a radius of curvature in a range of 6.0 mm to 9.0 mm.

3. A fuel cell according to claim 1, wherein a portion of said second seal member connected to said seal joint and said first seal member have a substantially same seal width.

4. A fuel cell according to claim 1, wherein said seal structure includes:

a base portion provided integrally on said separator;

a columnar portion protruding from said base portion with a predetermined draft angle; and a curved edge portion provided on said columnar portion, and having a predetermined radius of curvature.

5. A fuel cell according to claim 4, wherein said predetermined radius of curvature of said curved edge portion is in a range of 1.0 mm to 3.0 mm.

6. A fuel cell according to claim 4, wherein said predetermined draft angle of said columnar portion is in a range of 0° to 1°.

7. A fuel cell according to claim 1, wherein said seal structure includes:

a third seal member provided adjacent to at least one of said reactant gas supply passage and said reactant gas discharge passage for guiding a flow of said reactant gas; and another seal joint for connecting said first seal member and said third seal member, wherein said another seal joint has an interior angle defined by central lines of the first and third seal members in a range of 40° to 90°, and a curved portion for connecting the first and third seal members.

* * * * *